United States Patent
Sun

(10) Patent No.: US 9,066,056 B2
(45) Date of Patent: Jun. 23, 2015

(54) SYSTEMS FOR CONSTANT HUE AND ADAPTIVE COLOR CORRECTION IMAGE PROCESSING

(71) Applicant: Semiconductor Components Industries, LLC, Phoenix, AZ (US)

(72) Inventor: Qun Sun, San Jose, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 110 days.

(21) Appl. No.: 13/762,042

(22) Filed: Feb. 7, 2013

(65) Prior Publication Data

US 2013/0201363 A1      Aug. 8, 2013

Related U.S. Application Data

(60) Provisional application No. 61/596,186, filed on Feb. 7, 2012.

(51) Int. Cl.
*H04N 9/73* (2006.01)
*H04N 9/67* (2006.01)
*H04N 9/68* (2006.01)
*H04N 9/04* (2006.01)

(52) U.S. Cl.
CPC ................ *H04N 9/735* (2013.01); *H04N 9/045* (2013.01); *H04N 9/67* (2013.01); *H04N 9/68* (2013.01)

(58) Field of Classification Search
CPC ..... H04N 9/735; H04N 9/045; H04N 1/6086; H04N 9/73; H04N 2209/046
USPC ........................................................ 348/223.1
See application file for complete search history.

(56) References Cited

U.S. PATENT DOCUMENTS

| 8,305,666 B2 | 11/2012 | Ramanath | |
| 2005/0280716 A1* | 12/2005 | Toyoda | 348/222.1 |
| 2009/0147328 A1* | 6/2009 | Edge | 358/520 |
| 2011/0128297 A1* | 6/2011 | Ramanath | 345/590 |

FOREIGN PATENT DOCUMENTS

| EP | 1289268 | 2/2002 |
| WO | 9957486 | 3/1999 |
| WO | 9960353 | 11/1999 |

\* cited by examiner

*Primary Examiner* — Twyler Haskins
*Assistant Examiner* — Fayez Bhuiyan
(74) *Attorney, Agent, or Firm* — Treyz Law Group

(57) ABSTRACT

An electronic device may have a camera module. The camera module may capture images. The electronic device may include image processing circuitry that color corrects the images. The image processing circuitry may desaturate the images globally and/or spatially based on global and/or spatial noise levels of the image. The image processing circuitry may desaturate the images substantially without changing the hue of the images. The image processing circuitry may generate a color correction matrix with constant hue in real time and may color correct images in real time as the images are captured by the camera module.

14 Claims, 7 Drawing Sheets

SYSTEMS FOR CONSTANT HUE AND ADAPTIVE COLOR CORRECTION IMAGE PROCESSING

This application claims the benefit of provisional patent application No. 61/596,186, filed Feb. 7, 2012, which is hereby incorporated by reference herein in its entirety.

BACKGROUND

The present invention relates to imaging systems and, more particularly, to imaging systems with constant hue and adaptive color correction image processing Electronic devices such as cellular telephones are often provided with camera sensors. Image processing circuitry may sometimes be used to adjust images captured by the electronic devices. As an example, image processing circuitry may perform color desaturation on images captured by the electronic devices may sometimes be used. Conventional color desaturation techniques can produce noticeable and undesirable shifts in color hue.

DETAILED DESCRIPTION

Figure 1:
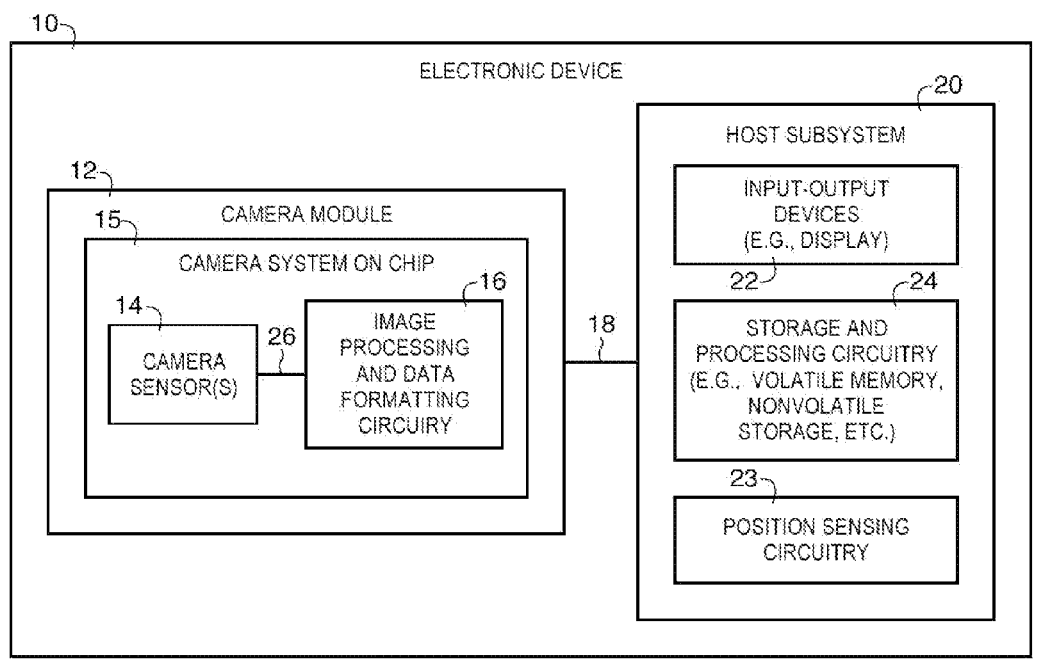
FIG. 1 is a diagram of an electronic device and computing equipment that may be used in color correcting images using constant hue color correction and using adaptive color correction in accordance with an embodiment of the present invention.

Digital camera modules are widely used in electronic devices. An electronic device with a digital camera module is shown in FIG. 1. Electronic device 10 may be a digital camera, a laptop computer, a display, a computer, a cellular telephone, or other electronic device. Imaging system 12 (e.g., camera module 12) may include one or more image sensors 14 and corresponding lenses. During operation, a lens focuses light onto an image sensor 14. The lens may have fixed aperture. The pixels in image sensor 14 include photosensitive elements that convert the light into digital data. Image sensors may have any number of pixels (e.g., hundreds or thousands or more). A typical image sensor may, for example, have millions of pixels (e.g., megapixels). In high-end equipment, sensors with 10 megapixels or more are not uncommon. In at least some arrangements, device 10 may include two (or more) image sensors 14, which may capture images from different perspectives. When device 10 includes two image sensors 14, device 14 may be able to capture stereo images.

Still and video image data from camera sensor 14 may be provided to image processing and data formatting circuitry 16 via path 26. Image processing and data formatting circuitry 16 may be used to perform image processing functions such as adjusting white balance and exposure and implementing video image stabilization, image cropping, image scaling, etc. Image processing and data formatting circuitry 16 may also be used to compress raw camera image files if desired (e.g., to Joint Photographic Experts Group or JPEG format).

In at least some situations, a user of device 10 may desire to apply color correction to images captured by device 10 (or obtained from another device). In particular, the user may desire to increase or decrease the color saturation of one or more images, without shifting the color hue of those images. In some embodiments, the color correction applied to images to adjust the color saturation of those images may be adjusted in response to the amount of noise in each image. If desired, images may be color corrected in real time using dynamically-adjusted color correction matrices that are tailored to each image in response to the amount of noise in each image.

In a typical arrangement, which is sometimes referred to as a system on chip or SOC arrangement, camera sensor 14 and image processing and data formatting circuitry 16 are implemented on a common integrated circuit 15. The use of a single integrated circuit to implement camera sensor 14 and image processing and data formatting circuitry 16 can help to minimize costs. If desired, however, multiple integrated circuits may be used to implement circuitry 15. In arrangements in which device 10 includes multiple camera sensors 14, each camera sensor 14 and associated image processing and data formatting circuitry 16 can be formed on a separate SOC integrated circuit (e.g., there may be multiple camera system on chip modules 12).

Circuitry 15 conveys data to host subsystem 20 over path 18. Circuitry 15 may provide acquired image data such as captured video and still digital images to host subsystem 20.

Electronic device 10 typically provides a user with numerous high level functions. In a computer or advanced cellular telephone, for example, a user may be provided with the ability to run user applications. To implement these functions, electronic device 10 may have input-output devices 22 such as projectors, keypads, input-output ports, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include processors such as microprocessors, microcontrollers, digital signal processors, application specific integrated circuits, etc.

Device 10 may include position sensing circuitry 23. Position sensing circuitry 23 may include, as examples, global positioning system (GPS) circuitry and radio-frequency-based positioning circuitry (e.g., cellular-telephone positioning circuitry).

Figure 2:
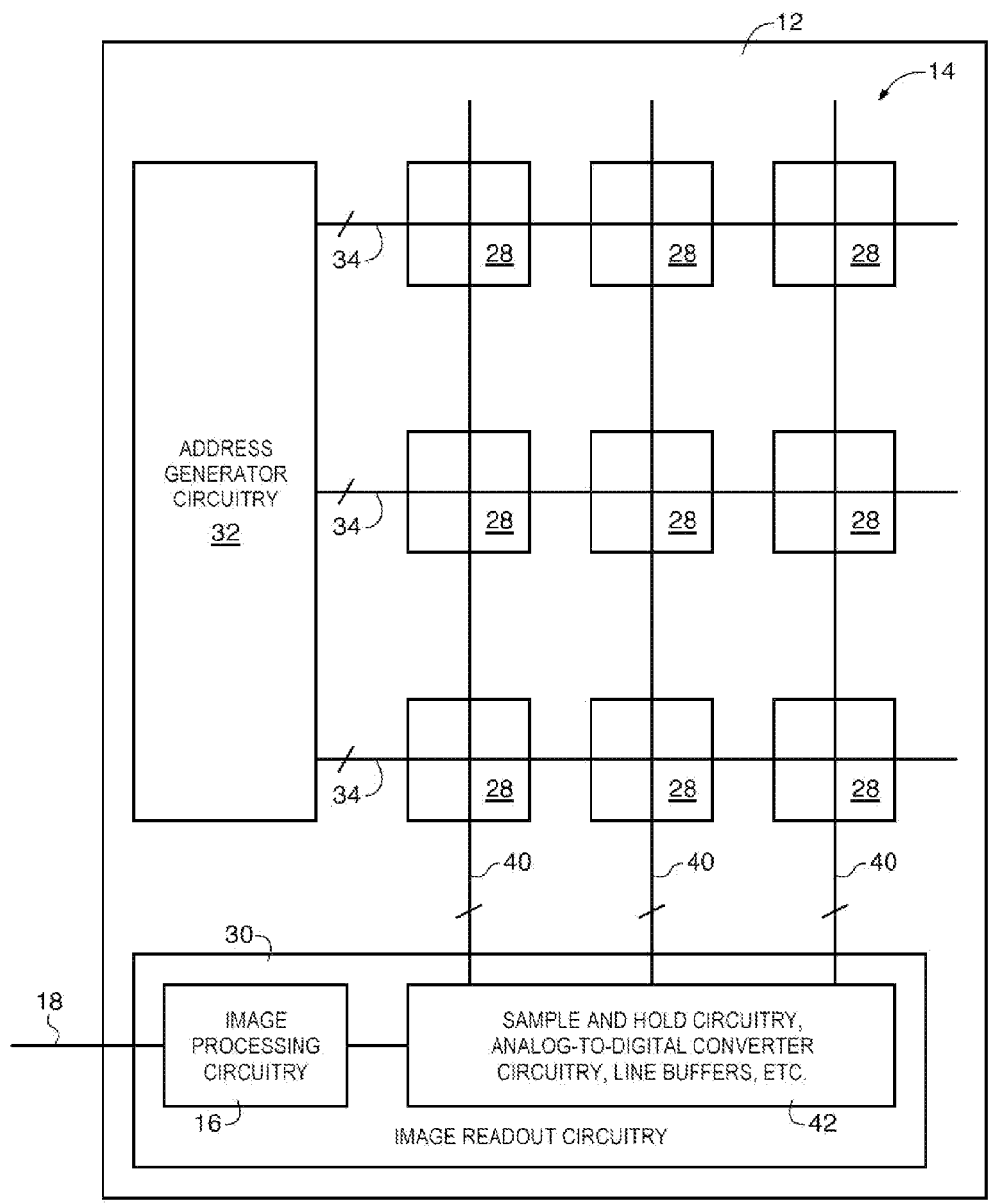
FIG. 2 is a diagram of an illustrative array of light-sensitive imaging pixels and control circuitry coupled to the array of pixels that may form a camera sensor such as the camera sensor of FIG. 1 in accordance with an embodiment of the present invention.

An example of an arrangement for sensor array 14 is shown in FIG. 2. As shown in FIG. 2, device 10 may include an array 14 of pixels 28 coupled to image readout circuitry 30 and address generator circuitry 32. As an example, each of the pixels in a row of array 14 may be coupled to address generator circuitry 32 by one or more conductive lines 34. Array 14 may have any number of rows and columns. In general, the size of array 14 and the number of rows and columns in array 14 will depend on the particular implementation. While rows and columns are generally described herein as being horizontal and vertical rows and columns may refer to any grid-like structure (e.g., features described herein as rows may be arranged vertically and features described herein as columns may be arranged horizontally).

Address generator circuitry 32 may generate signals on paths 34 as desired. For example, address generator circuitry 32 may generate reset signals on reset lines in paths 34, transfer signals on transfer lines in paths 34, and row select (e.g., row readout) signals on row select lines in paths 34 to control the operation of array 14. If desired, address generator circuitry 32 and array 14 may be integrated together in a single integrated circuit (as an example).

Signals 34, generated by address generator circuitry 32 as an example, may include signals that dynamically adjust the resolution of array 14. For example, signals 34 may include binning signals that cause pixels 28 in a first region of array 14 to be binned together (e.g., with a 2-pixel binning scheme, with a 3-pixel binning scheme, or with a pixel binning scheme of 4 or more pixels) and that cause pixels 28 in a second region of array 14 to either not be binned together or to be binned together to a lesser extent than the first region. In addition, signals 34 may cause pixels 28 in any number of additional (e.g., third, fourth, fifth, etc.) regions of array 14 to be binned together to any number of different, or identical, degrees (e.g., 2-pixel binning schemes, 3-or-more-pixel binning schemes, etc.).

Image readout circuitry 30 may include circuitry 42 and image processing and data formatting circuitry 16. Circuitry 42 may include sample and hold circuitry, analog-to-digital converter circuitry, and line buffer circuitry (as examples). As one example, circuitry 42 may be used to measure signals in pixels 28 and may be used to buffer the signals while analog-to-digital converters in circuitry 42 convert the signals to digital signals. In a typical arrangement, circuitry 42 reads signals from rows of pixels 28 one row at a time over lines 40. With another suitable arrangement, circuitry 42 reads signals from groups of pixels 28 (e.g., groups formed from pixels located in multiple rows and columns of array 14) one group at a time over lines 40. The digital signals read out by circuitry 42 may be representative of charges accumulated by pixels 28 in response to incident light. The digital signals produced by the analog-to-digital converters of circuitry 42 may be conveyed to image processing and data formatting circuitry 16 and then to host subsystem 20 (FIG. 1) over path 18.

Figure 3:
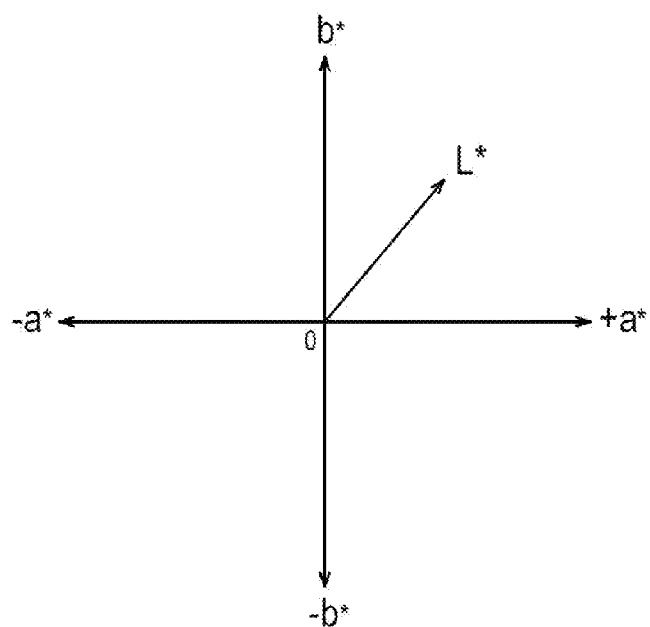
FIG. 3 is a schematic graph of an illustrative color space such as CIELAB that may be used in color correcting images using constant hue color correction and using adaptive color correction in accordance with an embodiment of the present invention.

A color space referred to herein as CIELAB, which may be used in color correction operations as described herein, is shown in FIG. 3. As shown in FIG. 3, the CIELAB color space is a three-dimensional model with an L* axis, an a* axis, and a b* axis. The L* axis represents the lightness of a pixel, with a zero value indicating black, a 100 value indicating diffuse white (when a* and b* are near zero). Values of L* above 100 are also possible in representations of specular white (e.g., mirror like white). The a* axis represents a pixel's position between red (positive a* values) and green (negative a* values). The b* axis represents a pixel's position between yellow (positive b* values) and blue (negative b* values).

In the CIELAB color space, chroma ($C^*_{ab}$), saturation ($S_{ab}$), and hue angle ($h_{ab}$) may be determined using the following respective equations:

$$C^*_{ab} = \text{SQRT}(a^{*2} + b^{*2}) \quad (1)$$

$$S_{ab} = C^*_{ab}/L^* \quad (2)$$

$$h_{ab} = \tan^{-1}(b^*/a^*) \quad (3)$$

In practice, saturation ($S_{ab}$) may sometimes be (e.g., alternatively) defined by the percentage of the ratio of the chroma produced (e.g., the chroma of the original image) to the targeted chroma, as shown in the following equation:

$$S = 100*(C^*_{ab\_produced}/C^*_{ab\_targeted}) \quad (4)$$

Figure 4:
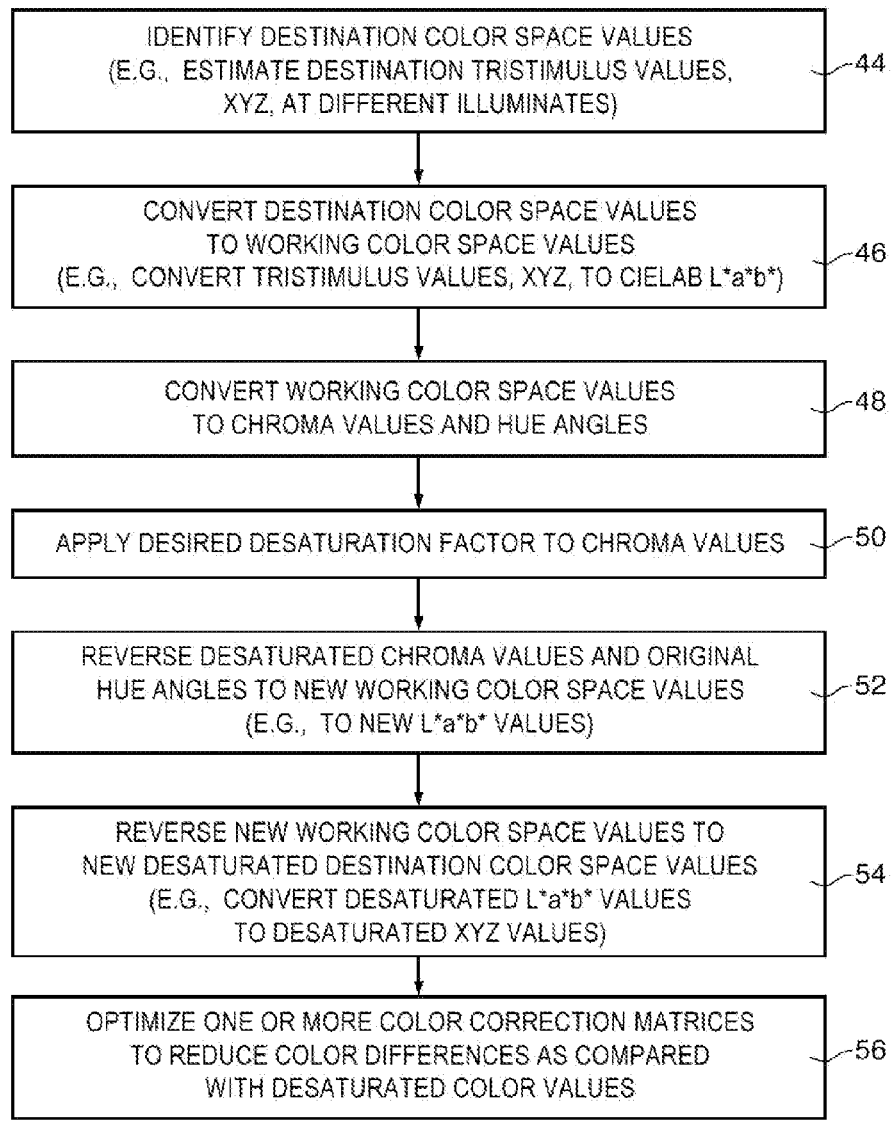
FIG. 4 is a flowchart of illustrate steps involved in generating a color correction matrix for use in color correcting images using constant hue color correction in accordance with an embodiment of the present invention.

In at least some embodiments, a user of device 10 may desire to adjust the color saturation of an image, without shifting the color hue of that image (at least because shifts in color hue are particularly noticeable to users and therefore may be undesirable). Illustrative steps that may be involved in generating color correction matrixes for adjusting the color saturation of an image, without shifting the color hue of that image, are shown in FIG. 4.

In step 44, circuitry, such as image processing circuitry 16, may identify color values in a destination color space. As an example, when the output color space is an sRGB color (defined at D65), destination color tristimulus values, XYZ (e.g., in the CIE XYZ color space) may be estimated at different illuminates (e.g., different types of light sources) using one or more chromatic adaption models such as the Bradford chromatic adaption or the RLab adaption models.

In step 46, the estimated destination color space values may be converted to a working color space. In particular, the estimated tristimulus values, XYZ, for the different illuminates may be converted into CIELAB color space values (e.g., a*, b*, and L* CIELAB values).

In step 48, the working color space values (e.g., a*, b*, and L* CIELAB values) may be converted into chroma values and associated hue angles (e.g., using equations 1 and 3). In particular, equations 1 and 3 may be used by circuitry such as image processing circuitry 16 to convert the CIELAB color space values obtained in step 46 into their respective chroma values and hue angles.

In step 50, a desired saturation factor may be applied to the chroma values obtained in step 48. The saturation factor may be a desaturation factor (e.g., a factor of less than one, such as 80%) that reduces the magnitudes of the chroma values obtained in step 48. If desired, the saturation factor may be a factor greater than one, such as 120%, which increases chroma values obtained in step 48. The saturation, or desaturation, factor may be user selectable.

In step 52, the (de)saturated chroma values (obtained in step 50) and original hue angles (obtained in step 48) may be converted back to working color space values. In particular, the new chroma values and original hue angles may be converted to new CIELAB a* and b* values using equations (1) and (3), in reverse.

In step 54, the new CIELAB values a* and b* obtained in step 52 and the original L* CIELAB values may be converted to new (de)saturated tristimulus values (e.g., X', Y', and Z').

In step 56, one or more color correction matrices may be generated (e.g., optimized) using the new (de)saturated tristimulus values (e.g., X', Y', and Z') obtained in step 54. The color correction matrix obtained in step 56 may be used to desaturate (or increase the saturation of) one or more images without changing the hue of those images.

Figure 5:
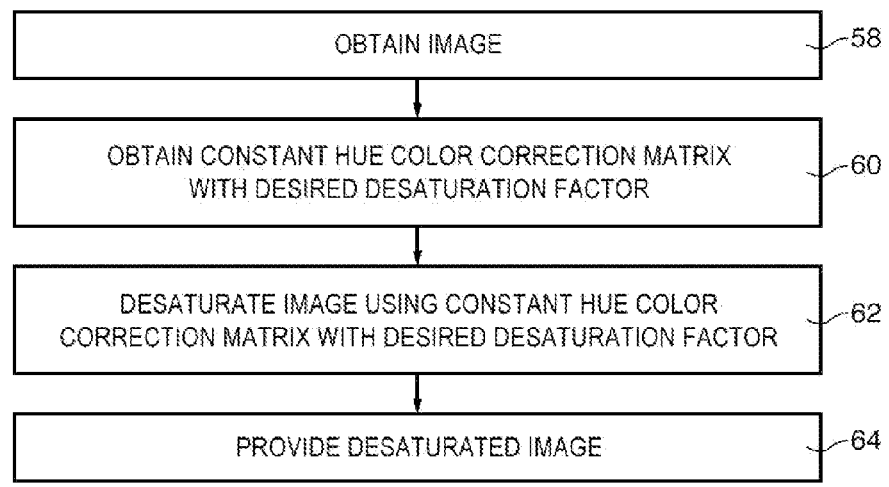
FIG. 5 is a flowchart of illustrative steps involved in color correcting images using constant hue color correction in accordance with an embodiment of the present invention.

After generating one or more color correction matrices in step 56, image processing circuitry such as circuitry 16 may apply the color correction matrices to an image. Illustrative steps involved in this process are shown in FIG. 5.

In step 58, image processing circuitry such as circuitry 16 may obtain an image. The image may be obtained by a camera sensor in device 10 such as sensor, or may be obtained by a camera sensor in another device and conveyed to device 10 via a communications path.

In step 60, one or more constant hue color correction matrices with the desired desaturation factor(s) may be obtained (e.g., using the steps of FIG. 4). If desired, a single color correction matrix may be used, when the image is to be uniformly desaturation. In still other arrangements, multiple color correction matrices may be used, each having a different desaturation factor, when the image is to be broken up into multiple regions and each region is to be desaturated by a different factor.

In step 62, the image obtained in step 58 may be desaturated using the one or more constant hue color correction matrices obtained in step 60. In particular, a single global constant hue color correction matrix may be applied to each pixel in the image obtained in step 58. Alternatively, the image may be separated into multiple regions and multiple constant hue color correction matrices, each having a different desaturation factor, may be used. In particular, it may be desirable to have at least a first region desaturated more than at least a second region. In such an arrangement, a first color correction matrix optimized for a first desaturation factor may be applied to the first region and a second color correction matrix optimized for a second and lower desaturation factor may be applied to the second region.

In step 64, the desaturated image produced in step 62 may be provided to other circuitry in device 10 or to an external device. As examples, the desaturated image may be conveyed to display circuitry and displayed for a user and/or the desaturated image may be conveyed to storage circuitry for storage and later use.

In some embodiments, it may be desirable to provide real-time (i.e., live) image processing. In particular, it may be desirable to color correct images as they are captured by an imager. This type of arrangement may be easier in system on chip (SOC) arrangements in which image processing circuitry such as circuitry 16 and a camera sensor such as sensor 14 are formed on a single integrated circuit 15. When providing real-time color correction, a color correction matrix may be selected based on auto-white balance information (e.g., on information identifying the type of illuminate, such as a high color temperature illuminate, a low color temperature illuminate, etc.). If desired, a color correction matrix may be dynamically, both globally and spatially, adapted to image noise levels, such that the saturation level of the color corrected image (globally and/or spatially) is adapted based on the noise level of the image (globally and/or spatially) to optimize image quality. As an example, an image sensor noise characterization may be made, using inputs such as integration time, analog gain, and corresponding pixel responses, and, based on the identify noise level therefrom, an appropriate color correction matrix for that noise level may be selected.

Figure 6:
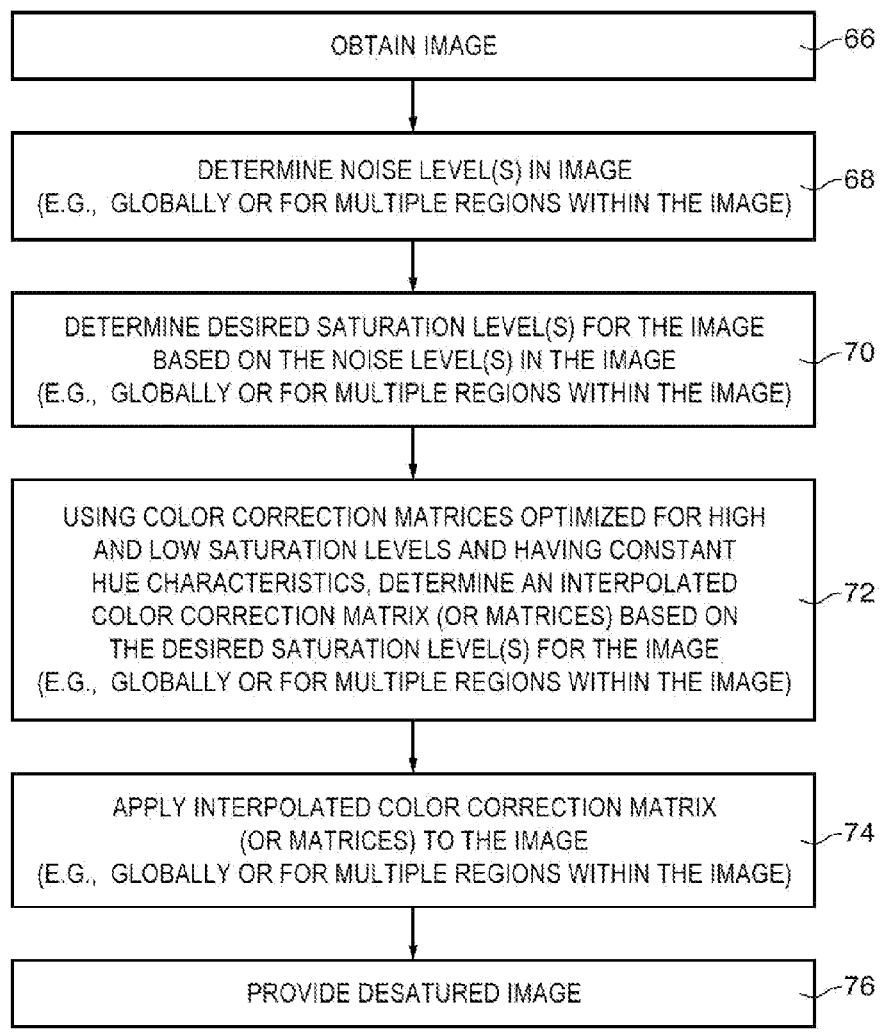
FIG. 6 is a flowchart of illustrative steps involved in generating an interpolated color correction matrix for use in color correcting image using adaptive color correction and applying the interpolated color correction matrix to an image in accordance with an embodiment of the present invention.

Illustrative steps involved in generating a color correction matrix based on noise levels (which can be related to saturation levels) are shown in FIG. 6.

In step 66, image processing circuitry such as circuitry 16 may obtain an image. The image may be obtained by a camera sensor in device 10 such as sensor, or may be obtained by a camera sensor in another device and conveyed to device 10 via a communications path.

In step 68, noise levels may be determined for the image. A global noise level may be determined for the image. Alternatively or in addition, the image may be divided into multiple regions and a noise level for each region may be determined. A region of the image may be formed from a block of pixels of any desired size.

In step 70, the noise level(s) determined in step 68 may be converted into (a) desired saturation level(s). Since there is a relationship between color saturation and image noise when images are optimized for image quality, the relationship between color saturation and image noise which optimizes image quality can be used to convert the noise level (global) or noise levels (for multiple regions) into a desired global saturation level or desired regional saturation levels.

In step 72, the desired global saturation level is used in generating a color correction matrix customized for that saturation level. When there are multiple regional desired saturation levels, each regional desired saturation level is used in generating a respective color correction matrix customized for that regional saturation level. Color correction matrices customized for a particular saturation level may be generated using the following equation:

$$\text{ccm} = ((\text{sat} - \text{sat}L)/(\text{sat}H - \text{sat}L))^* \text{ccm}H + ((\text{sat}H - \text{sat})/(\text{sat}H - \text{sat}L))^* \text{ccm}_L \quad (5)$$

where sat is equal to the desired saturation level, satL and satH define the lower end and upper end of the desired range of saturation levels, ccmL and ccmH are constant hue color correction matrices determined using the techniques described in connection with FIG. 4 for the respective upper and lower saturation levels satL and satH.

In step 74, the interpolated color correction matrix or matrices obtained in step 72 may be applied to the image obtained in step 66 to desaturate the image (globally or regionally). As an example, each region of the image may be desaturated using a color correction matrix optimized for the noise level of that region.

In step 76, the desaturated image produced in step 74 may be provided to other circuitry in device 10 or to an external device. As examples, the desaturated image may be conveyed to display circuitry in device 10 and displayed for a user and/or the desaturated image may be conveyed to storage circuitry (internal or external to device) for storage and later use.

Figure 7:
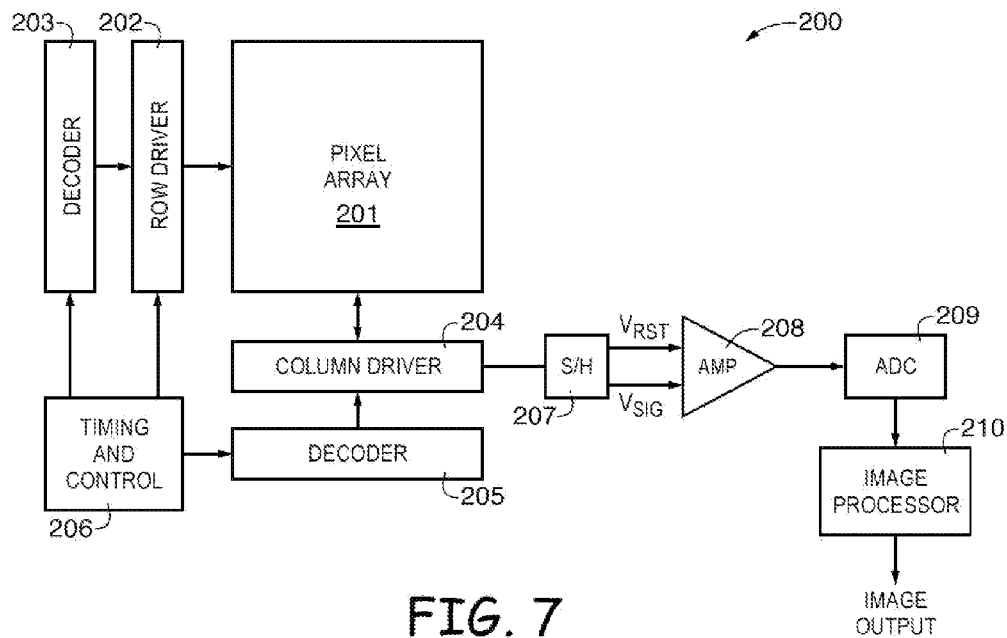
FIG. 7 is a block diagram of an imager employing one or more of the embodiments of FIGS. 1-6 in accordance with an embodiment of the present invention.

FIG. 7 illustrates a simplified block diagram of imager 200 (e.g., a CMOS imager that may capture images that are then manipulated by image processing circuitry, such as circuitry 16 and/or circuitry 24 of FIG. 1, using constant hue and/or adaptive color correction techniques as described herein). Pixel array 201 includes a plurality of pixels containing respective photosensors arranged in a predetermined number of columns and rows. The row lines are selectively activated by row driver 202 in response to row address decoder 203 and the column select lines are selectively activated by column driver 204 in response to column address decoder 205. Thus, a row and column address is provided for each pixel.

CMOS imager 200 is operated by a timing and control circuit 206, which controls decoders 203, 205 for selecting the appropriate row and column lines for pixel readout, and row and column driver circuitry 202, 204, which apply driving voltages to the drive transistors of the selected row and column lines. The pixel signals, which typically include a pixel reset signal Vrst and a pixel image signal Vsig for each pixel are sampled by sample and hold circuitry 207 associated with the column driver 204. A differential signal Vrst-Vsig is produced for each pixel, which is amplified by amplifier 208 and digitized by analog-to-digital converter 209. The analog to digital converter 209 converts the analog pixel signals to digital signals, which are fed to image processor 210 which forms a digital image.

Figure 8:
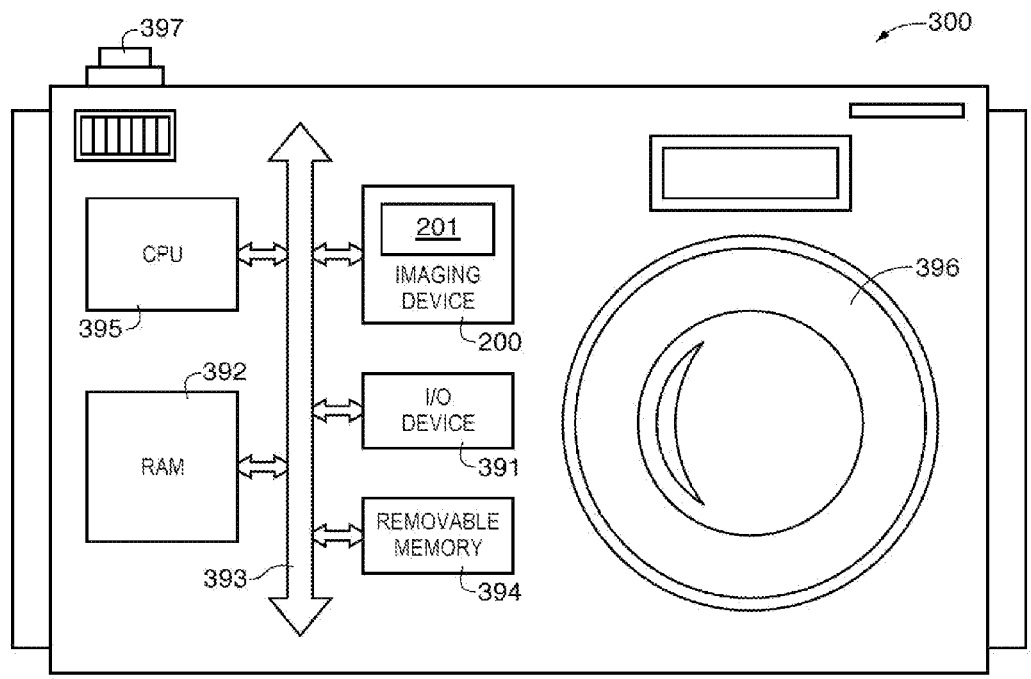
FIG. 8 is a block diagram of a processor system employing the imager of FIG. 7 in accordance with an embodiment of the present invention.

FIG. 8 shows in simplified form a typical processor system 300, such as a digital camera, which includes an imaging device such as imaging device 200 (e.g., an imaging device 200 that may capture images that are then manipulated by image processing circuitry, such as circuitry 16 and/or circuitry 24 of FIG. 1, using constant hue and/or adaptive color correction techniques as described herein). Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating image processing systems for adjusting the saturation levels of an image while holding hue values constant.

An electronic device may have a camera module. The camera module may capture images. The electronic device may include image processing circuitry that color corrects the images. The image processing circuitry may desaturate the images globally and/or spatially based on global and/or spatial noise levels of the image. The image processing circuitry may desaturate the images substantially without changing the hue of the images. The image processing circuitry may generate a color correction matrix with constant hue in real time and may color correct images in real time as the images are captured by the camera module. The resulting desaturated image may be stored on storage circuitry, displayed on one or more display devices, and/or conveyed to an external device.

The foregoing is merely illustrative of the principles of this invention and various modifications can be made by those skilled in the art without departing from the scope and spirit of the invention. The foregoing embodiments may be implemented individually or in any combination.

What is claimed is:

1. A method, comprising:
   for each of a plurality of initial colors, estimating color space coordinates, including a lightness value (L*), a red-green value (a*), and a yellow-blue value (b*), that correspond to that initial color;
   for each of the estimated color space coordinates, converting the red-green value (a*) and the yellow-blue value (b*) into a chroma value and a hue angle, wherein converting the red-green value (a*) and the yellow-blue value (b*) into a chroma value comprises calculating the chroma value as the square root of the sum of the square of the red-green value (a*) and the square of the yellow-blue value (b*);
   applying a desaturation factor to each of the chroma values to generate corresponding desaturated chroma values;
   for each of the desaturated chroma values, converting that desaturated chroma value and the associated hue angle into a desaturated red-green value (a*) and a desaturated yellow-blue value (b*);
   converting each of the desaturated red-green values (a*), the desaturated yellow-blue values (b*), and the associated lightness values (L*) into a respective one of a plurality of desaturated colors;
   generating a color correction matrix relating the initial colors to the desaturated colors; and
   with image processing circuitry, applying the color correction matrix to at least one image to reduce saturation levels of the image without substantially altering hues in the image.

2. The method defined in claim 1 wherein the color space coordinates are within the CIELAB color space.

3. The method defined in claim 1 wherein converting, for each of the estimated color space coordinates, the red-green value (a*) and the yellow-blue value (b*) into the chroma value and the hue angle further comprises, for each of the estimated color space coordinates:
   calculating the hue angle as the arctan of the yellow-blue value (b*) divided by the red-green value (a*).

4. The method defined in claim 1 further comprising:
   receiving user input specifying a magnitude of the desaturation factor.

5. A method, comprising:
   obtaining a first color correction matrix operable to reduce saturation levels of a first image by a first factor without substantially altering hues in the second image;
   obtaining a second color correction matrix operable to reduce saturation levels of a second image by a second factor without substantially altering hues in the second image;
   obtaining a given image;
   with image processing circuitry, determining a noise level for at least a portion of the given image;
   weighting the first color correction matrix with a first weighting factor based at least partly on the noise level of the portion of the image;
   weighting the second color correction matrix with a second weighting factor based at least partly on the noise level of the portion of the image;
   generating a third color correction matrix by summing together the weighted first color correction matrix and the weighted second color correction matrix; and
   with the image processing circuitry, applying the third color correction matrix to the portion of the given image to reduce saturation levels in the given image without substantially altering hues in the given image.

6. The method defined in claim 5 wherein obtaining the first color correction matrix comprises:
   for each of a plurality of initial colors, estimating color space coordinates, including a lightness value (L*), a red-green value (a*), and a yellow-blue value (b*), that correspond to that initial color;
   for each of the estimated color space coordinates, converting the red-green value (a*) and the yellow-blue value (b*) into a chroma value and a hue angle;
   applying the first factor to each of the chroma values to generate corresponding desaturated chroma values;

for each of the desaturated chroma values, converting that desaturated chroma value and the associated hue angle into a desaturated red-green value (a*) and a desaturated yellow-blue value (b*);

converting each of the desaturated red-green values (a*), the desaturated yellow-blue values (b*), and the associated lightness values (L*) into a respective one of a plurality of desaturated colors; and generating the first color correction matrix to relate the initial colors to the desaturated colors.

7. The method defined in claim 5 wherein obtaining each of the first and second color correction matrices comprises:

for each of a plurality of initial colors, estimating color space coordinates, including a lightness value (L*), a red-green value (a*), and a yellow-blue value (b*), that correspond to that initial color;

for each of the estimated color space coordinates, converting the red-green value (a*) and the yellow-blue value (b*) into a chroma value and a hue angle;

when obtaining the first color correction matrix, applying the first factor to each of the chroma values to generate corresponding desaturated chroma values;

when obtaining the second color correction matrix, applying the second factor to each of the chroma values to generate corresponding desaturated chroma values;

for each of the desaturated chroma values, converting that desaturated chroma value and the associated hue angle into a desaturated red-green value (a*) and a desaturated yellow-blue value (b*);

converting each of the desaturated red-green values (a*), the desaturated yellow-blue values (b*), and the associated lightness values (L*) into a respective one of a plurality of desaturated colors; and generating the second color correction matrix to relate the initial colors to the desaturated colors.

8. The method defined in claim 5 wherein the at least one portion of the given image comprises the entire given image.

9. The method defined in claim 5 wherein the portion of the given image comprises a first portion of the image, the method further comprising:

with the image processing circuitry, determining a noise level for a second portion of the image;

weighting the first color correction matrix with a third weighting factor based at least partly on the noise level of the second portion of the image;

weighting the second color correction matrix with a fourth weighting factor based at least partly on the noise level of the second portion of the image;

generating a fourth color correction matrix by summing together the first color correction matrix weighted with the third weighting factor and the second color correction matrix weighted with the fourth weighting factor; and with the image processing circuitry, applying the fourth color correction matrix to the second portion of the given image to reduce saturation levels in the given image without substantially altering hues in the given image.

10. The method defined in claim 5 further comprising:

based determined noise level for the portion of the given image, determining a desirable saturation level for the portion of the given image, wherein the first and second weighting factors are based at least partly on the desirable saturation level for the portion of the given image.

11. A system, comprising:

a central processing unit;

memory;

input-output circuitry;

an imaging device that captures an image; and image processing circuitry that uses a color correction matrix to desaturate colors in the image without substantially altering hues in the image, wherein the color correction matrix desaturates chroma values while maintaining hue angles in the CIELAB color space and is generated by:

for each of a plurality of initial colors, estimating color space coordinates, including a lightness value (L*), a red-green value (a*), and a yellow-blue value (b*), that correspond to that initial color;

for each of the estimated color space coordinates, converting the red-green value (a*) and the yellow-blue value (b*) into a chroma value, wherein converting the red-green value (a*) and the yellow-blue value (b*) into a chroma value comprises calculating the chroma value as the square root of the sum of the square of the red-green value (a*) and the square of the yellow-blue value (b*).

12. The system defined in claim 11 wherein the image processing circuitry further generates the color correction matrix by:

for each of the estimated color space coordinates, converting the red-green value (a*) and the yellow-blue value (b*) into a hue angle;

applying a desaturation factor to each of the chroma values to generate corresponding desaturated chroma values;

for each of the desaturated chroma values, converting that desaturated chroma value and the associated hue angle into a desaturated red-green value (a*) and a desaturated yellow-blue value (b*);

converting each of the desaturated red-green values (a*), the desaturated yellow-blue values (b*), and the associated lightness values (L*) into a respective one of a plurality of desaturated colors; and generating the color correction matrix to relate the initial colors to the desaturated colors.

13. The system defined in claim 11 wherein the image processing circuitry and the imaging device are formed on a common integrated circuit.

14. The system defined in claim 11 wherein the image processing circuitry and the imaging device are formed on a common system on chip integrated circuit.

* * * * *